J. B. Stockton,
Rock-Drill Chuck.
Nº 50,287. Patented Oct. 3, 1865.
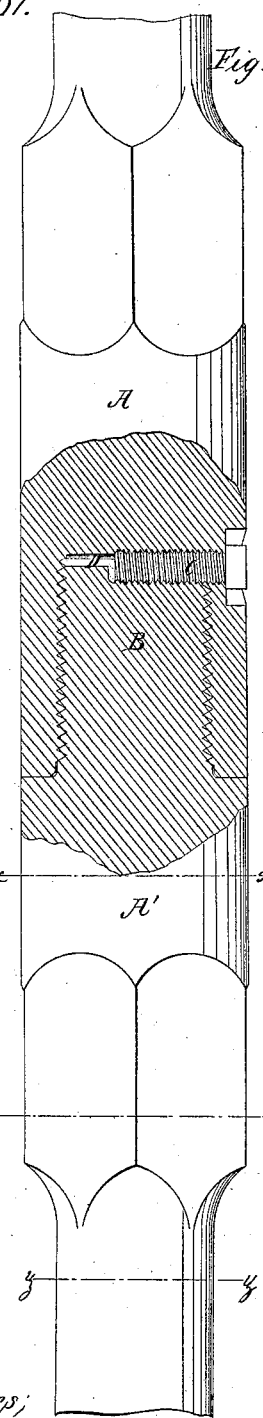
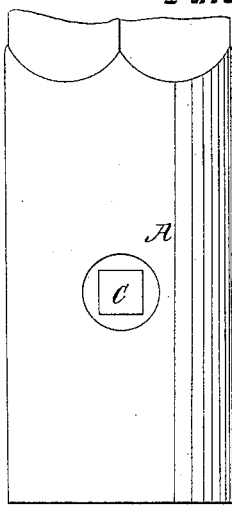
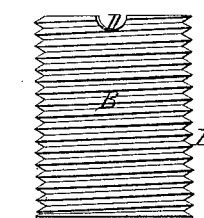
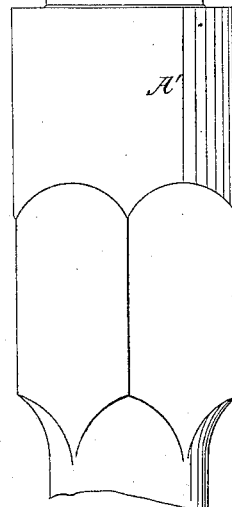
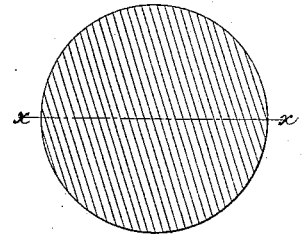
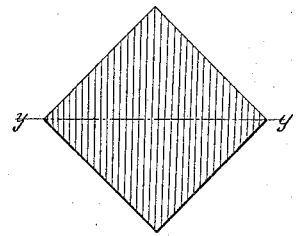
Witnesses:
Inventor;

UNITED STATES PATENT OFFICE.

JOB B. STOCKTON, OF OIL CITY, PENNSYLVANIA.

COUPLING FOR SHAFTS OF BORING-TOOLS.

Specification forming part of Letters Patent No. 50,287, dated October 3, 1865.

*To all whom it may concern:*

Be it known that I, JOB B. STOCKTON, of Oil City, in the county of Venango and State of Pennsylvania, have invented a new and useful Improvement in Drill-Couplings; and I do hereby declare that the following is a full, clear, and exact description thereof, which will enable those skilled in the art to make and use the same, reference being had to the accompanying drawings, forming part of this specification, in which—

Figure 1 represents a part of a drill-rod such as is used in drilling oil-wells, comprising one of the joints which couple adjacent sections, the joint being shown in section. Figs. 2 and 3 are peripherical views of the ends of the sections when separated. Figs. 4, 5, and 6 are cross-sections on the lines $x$, $y$, and $z$ of Fig. 1.

Similar letters of reference indicate corresponding parts.

This invention consists in a new method of making joints or couplings, by which drilling-tools are fastened on their rods and the sections of the rods coupled to each other, whereby the joint is made with facility and without injury to the screw-thread or to the joint itself.

One of the most serious difficulties now experienced in drilling an oil-well is from the constant tendency in the couplings of the drill-rod to become unscrewed, and since there are four or more in every set of tools, the hinderances from this cause are frequent. Another difficulty arises from the breaking off of the male screw at its shoulder, caused by the excessive wrenching to which it is subjected when the joint is put together. Another difficulty is the stripping of the threads of the screw by reason of the violent jar when the drill gives its stroke.

The present manner of "wrenching on" the joints or couplings of drill-rods and their tools is about as follows. Two iron wrenches several feet long are used, the lower one resting against the ground or some fixed body and the upper one being turned as tight as possible by hand, when two men, with a wooden lever about six or eight feet long, surge with all their might against the wrench. This throws an immense strain upon the threads, creating new bearings and angles and causing them to become stripped and broken.

This invention is meant to preserve the joints and couplings aforesaid, and to provide a more certain connection, and one which costs less labor to make secure.

A A' designate two adjoining sections of an ordinary drill-rod for boring oil-wells. The upper one has a socket in its lower end to receive the end B of the adjacent section or the end of the shank of a drill, as the case may be. The end or tongue B screws into said socket. D is a cavity made through one side of the recessed portion of the section A, along the line of its bottom and along the line of its diameter. This cavity is provided with a screw-thread, so as to receive a screw-bolt.

It is evident that, if the cavity D is tapped when the male part B of the joint is snug in the socket of the upper section and near its bottom, the cavity D will be made partly in the end of the part B.

The screw-bolt C is inserted in the cavity D, and its head may be made with a shoulder fitting in a countersink in the side of the rod, or it may be of the same size throughout, and a square socket for receiving a wrench may be made in its end. The length of the screw-bolt C may be equal to the radius of the section A, or a little greater. When the joint is secured in this way it is apparent that it is locked as with a key, such key having no tendency to work out, because the rotation of the male part B of the joint is in the contrary direction from the socket, and the key therefore prevents the motion of each.

In applying my invention I am able to save the labor of one man in wrenching the tools onto the rod or in coupling the joints of the rod, since it is only necessary to screw them up until the boxing is perfectly tight, and I thereby relieve or dispense with the immense strain upon the thread, and the consequent liability of the male tap to break or strip its threads, and also lessen the probability of loosening the tools or bits in the well.

I claim as new and desire to secure by Letters Patent—

In fastening drilling-tools on their rods and in securing the couplings of drilling-rods, locking the parts to each other by means of a screw inserted radially through the walls of the outer part or half of the coupling, so as to intersect the place of the joint, substantially as described.

JOB B. STOCKTON.

Witnesses:
M. E. LUCE,
D. S. ANDERSON.